United States Patent
Perry

(10) Patent No.: US 10,607,282 B2
(45) Date of Patent: Mar. 31, 2020

(54) OPENTAP ALCOHOL INVENTORY BIDDING APPLICATION

(71) Applicant: Scott Perry, Virginia Beach, VA (US)

(72) Inventor: Scott Perry, Virginia Beach, VA (US)

(*) Notice: Subject to any disclaimer, the term of this patent is extended or adjusted under 35 U.S.C. 154(b) by 792 days.

(21) Appl. No.: 15/207,452

(22) Filed: Jul. 11, 2016

(65) Prior Publication Data

US 2017/0011453 A1   Jan. 12, 2017

Related U.S. Application Data

(60) Provisional application No. 62/190,310, filed on Jul. 9, 2015.

(51) Int. Cl.
| | | |
|---|---|---|
| *G06Q 30/00* | (2012.01) | |
| *G06Q 30/08* | (2012.01) | |
| *G06Q 10/08* | (2012.01) | |
| *G06Q 50/12* | (2012.01) | |

(52) U.S. Cl.
CPC ........... *G06Q 30/08* (2013.01); *G06Q 10/087* (2013.01); *G06Q 50/12* (2013.01)

(58) Field of Classification Search
None
See application file for complete search history.

(56) References Cited

U.S. PATENT DOCUMENTS

| | | | | |
|---|---|---|---|---|
| 2001/0032165 A1* | 10/2001 | Friend | ............ | G06Q 30/06 705/37 |
| 2002/0123957 A1* | 9/2002 | Notarius | ............ | G06Q 30/06 705/37 |
| 2003/0069774 A1* | 4/2003 | Hoffman | ............ | G06Q 10/06 705/7.29 |
| 2006/0095333 A1* | 5/2006 | Gambhir | ............ | G06Q 10/087 705/25 |
| 2006/0167878 A1* | 7/2006 | Hartman | ............ | G06Q 30/02 |
| 2006/0195563 A1* | 8/2006 | Chapin | ............ | G06Q 10/087 709/223 |
| 2014/0164046 A1* | 6/2014 | Haralambos | ............ | G06Q 30/06 705/7.25 |
| 2016/0019507 A1* | 1/2016 | Takamura | ............ | G06Q 30/06 705/39 |

OTHER PUBLICATIONS

Normans Media Ltd; "M.Fredric Transforms Retail POS and Inventory Management Software with Latest Version of NCR Counterpoint; Custom retail management solution from NCR allows M.Fredric to access comprehensive real-time sales data anytime, anywhere"; Jun. 2, 2015; Normans Media Ltd (Year: 2015).*

* cited by examiner

*Primary Examiner* — Naeem U Haq
*Assistant Examiner* — Norman Donald Sutch, Jr.
(74) *Attorney, Agent, or Firm* — Daniel N. Smith

(57) ABSTRACT

A system and method for real-time viewing, ordering, and scheduling deliveries of alcoholic beverages by retailers from databases of updated available inventories from distributors or producers. The system and method also include real-time viewing of alcoholic beverage inventory vacancies of retailers and bidding to file the vacancies by distributor or producers.

13 Claims, No Drawings

OPENTAP ALCOHOL INVENTORY BIDDING APPLICATION

CROSS REFERENCE TO RELATED APPLICATION

This application claims the benefit of U.S. Provisional Patent Application No. 62/190,310, filed on Jul. 9, 2015, the contents of which are incorporated herein by reference.

FIELD OF THE INVENTION

This invention relates to a software application that will permit alcohol beverage vendors to upload and maintain alcoholic beverage inventories.

BACKGROUND OF INVENTION

The past few years have witnessed an explosive growth in small independent breweries. By 2012, the number of small independent breweries operating in the U.S. surpassed pre-prohibition numbers. New breweries now open on an almost daily basis, all offering many unique types of beers. According to the Brewers Association, in 2013, 304 breweries opened while only 20 closed. This is a failure rate of 6.6%, which is better than several of the most profitable franchise eateries.

Despite this widespread growth, sales for independent breweries are still relatively weak in comparison to large commercial breweries, such as Anheuser Busch® and Miller Coors®. Independent brewery craft beer sales were about 7.8% of all the beer sales in the U.S. in 2013. Small independent breweries run low profit margins, which inhibits their ability to grow and reach beyond their local markets.

One of the largest obstacles preventing small independent breweries from growing faster is the three-tier alcoholic beverage distribution system.

The three-tier alcoholic beverage distribution system was established in the United States following the repeal of Prohibition. The three-tier alcoholic beverage distribution can vary significantly from State to State.

The three-tiers of this system are retail (alcoholic beverage producers), distribution (wholesale distributors), and retail (consumer retailers). Within this system producers, which include brewers, wine makers, distillers and importers, can only sell their alcoholic beverages to wholesale distributors. They cannot sell to retailers, or directly to the public. Wholesale distributors can sell to retailers, but not to the public. Retailers may sell to general consumers.

The inventories, distribution, and ordering of alcoholic beverages must be tightly managed as these beverages are perishable or have peak taste expiration dates.

The justification for the three-tier alcoholic beverage distribution system is to regulate and control the alcohol industry lest it return to the excesses and abuses that led to Prohibition. The three-tier alcoholic beverage distribution system prevents any private, single ownership of all three tiers, production, distribution, and retail. The three-tier alcoholic beverage distribution system also provides the States with methods to easily levy and collect taxes on alcohol producers.

The three-tier alcoholic beverage distribution results in higher prices for consumers, lower profits for producers, and uneven distribution of alcoholic beverages. Each tier of the system must produce a profit, so the consumer must pay for the profit of the producer, wholesale distributor, and the retailer.

Many wholesale distributors have been swamped with the high volumes of new breweries, making it more difficult for small independent breweries to distribute their product. Wholesale distributors, who usually operate with small numbers in a large territory, simply cannot handle the numbers of SKUs and product complexity. Many retailers cannot offer their limited shelf space to new products. In such a competitive market, independent breweries will operate at low margins to attract distributors' retailers with limited retail space to their products with larger profit margins. These low margins prevent small independent breweries from growing and expanding their products.

A further obstacle to small independent breweries in this system is the ownership of several large wholesale distributors by large commercial breweries. These distributors will move their products first to retailers, even if to occupy retail shelf space to deny it to small independent breweries.

Thus, there is a need for a new system that allows small independent brewers to more efficiently attract wholesale distributors and retailers to their products as while also allowing these small manufacturers the ability to take advantage of states that allow self distribution.

SUMMARY OF THE INVENTION

There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The subject invention discloses a system for providing substantial real-time bids to fill vacancies in retailer alcoholic beverage inventories, comprising: a computing device comprising executable software; a data storage device; a first database of a plurality of alcoholic beverage retailer identification information on the data storage device; a second database of alcoholic beverage inventory vacancies for each retailer on the data storage device, wherein the second database is updated by each retailer; a third database of a plurality of alcoholic beverage distributor identification information on the data storage device; a fourth database of alcoholic beverage available inventory from each of the plurality of distributors on the data storage device, wherein the fourth database is updated by each distributor; a fifth database of distributors generated in substantial real time by the system by: i) matching the first database of retailers with the third database for distributors that have a delivery radius which includes the location of the retailers, and ii) matching the second database inventory vacancies from the retailer with the fourth database of available inventories; and wherein the distributors access the fifth database to select and make bids on the inventory vacancy of retailers matched in the fifth database.

The subject invention also discloses a system for providing substantial real-time order sheets to fill vacancies in retailer alcoholic beverage inventories, comprising: a computing device comprising executable software; a data storage device; a first database of a plurality of alcoholic beverage retailer identification information on the data storage device; a second database of alcoholic beverage inventory vacancies for each retailer on the data storage device, wherein the second database is updated by each retailer; a third database of a plurality of alcoholic beverage distributor identification information on the data storage device; a fourth database of alcoholic beverage available inventory from each of the plurality of distributors on the data storage device, wherein the fourth database is updated by each distributor; a fifth database of distributors generated in substantial real time by the system by: i) matching the first database of retailers with the third database for distributors that have a delivery radius which includes the location of the retailers, and ii) matching the second database inventory vacancies from the retailer with the fourth database of available inventories; and wherein the retailers access the fifth database to select and place orders on the available inventory of distributors.

The subject invention further discloses a system for providing substantial real-time orders to fill vacancies in retailer alcoholic beverage inventories, comprising: a computing device comprising executable software; a data storage device; a first database of a plurality of alcoholic beverage retailer identification information on the data storage device; a second database of alcoholic beverage inventory vacancies for each retailer on the data storage device, wherein the second database is updated by each retailer; a third database of a plurality of alcoholic beverage distributor identification information on the data storage device; a fourth database of alcoholic beverage available inventory from each of the plurality of distributors on the data storage device, wherein the fourth database is updated by each distributor; a fifth database of distributors generated in substantial real time by the system by: i) matching the first database of retailers with the third database for distributors that have a delivery radius which includes the location of the retailers, and ii) matching the second database inventory vacancies from the retailer with the fourth database of available inventories; wherein the distributors access the fifth database to select and make bids on the inventory vacancy of retailers matched in the fifth database, and further wherein retailers access the fifth database to select and place orders on the available inventory of distributors.

The subject invention additionally discloses a system for providing substantial real-time orders to fill vacancies in retailer alcoholic beverage inventories, comprising: a computing device comprising executable software; a data storage device; a first database of a plurality of alcoholic beverage retailer identification information on the data storage device; a second database of alcoholic beverage inventory vacancies for each retailer on the data storage device, wherein the second database is updated by each retailer; a third database of a plurality of alcoholic beverage distributor identification information on the data storage device; a fourth database of alcoholic beverage available inventory from each of the plurality of distributors on the data storage device, wherein the fourth database is updated by each distributor; a fifth database of distributors generated in substantial real time by the system by: i) matching the first database of retailers with the third database for distributors that have a delivery radius which includes the location of the retailers, and ii) matching the second database inventory vacancies from the retailer with the fourth database of available inventories; wherein the distributors access the fifth database to select and make bids on the inventory vacancy of retailers matched in the fifth database; a transaction order generated by the system for each bid accepted by each retailer; and a completed order generated by the system upon delivery of inventory from the each distributor to each retailer.

The subject invention also discloses a system for providing substantial real-time orders to fill vacancies in retailer alcoholic beverage inventories, comprising: a computing device comprising executable software; a data storage device; a first database of a plurality of alcoholic beverage retailer identification information on the data storage device; a second database of alcoholic beverage inventory vacancies for each retailer on the data storage device, wherein the second database is updated by each retailer; a third database of a plurality of alcoholic beverage distributor identification information on the data storage device; a fourth database of alcoholic beverage available inventory from each of the plurality of distributors on the data storage device, wherein the fourth database is updated by each distributor; a fifth database of distributors generated in substantial real time by the system by: i) matching the first database of retailers with the third database for distributors that have a delivery radius which includes the location of the retailers, and ii) matching the second database inventory vacancies from the retailer with the fourth database of available inventories; wherein the retailers access the fifth database to select and place orders on the available inventory of distributors matched in the fifth database; a transaction order generated by the system for each order accepted by each distributor; and a completed order generated by the system upon delivery of ordered inventory from each distributor to each retailer.

The subject invention also discloses a system for providing substantial real-time orders to fill vacancies in retailer alcoholic beverage inventories, comprising: a computing device comprising executable software; a data storage device; a first database of a plurality of alcoholic beverage retailer identification information on the data storage device; a second database of alcoholic beverage inventory vacancies for each retailer on the data storage device, wherein the second database is updated by each retailer; a third database of a plurality of alcoholic beverage distributor identification information on the data storage device; a fourth database of alcoholic beverage available inventory from each of the plurality of distributors on the data storage device, wherein the fourth database is updated by each distributor; a fifth database of distributors generated in substantial real time by the system by: i) matching the first database of retailers with the third database for distributors that have a delivery radius which includes the location of the retailers, and ii) matching the second database inventory vacancies from the retailer with the fourth database of available inventories; and wherein the system automatically notifies retailers and distributors in substantial real time of fifth database matches in retailer inventory vacancies with available inventory of distributors.

The subject invention discloses a method of providing substantial real-time bids to fill vacancies in retailer alcoholic beverage inventories, comprising: a) providing interactive computing devices for use by the a plurality of alcoholic beverage retailers and a plurality of alcoholic beverage distributors, the interactive computing devices operable to receive and display a series of graphical user interface screens from a content management system; b) transmitting a first account registration screen to each retailer, the first account registration screen promoting each retailer to provide identification information to identify each retailer; c) receiving a response from each retailer from the first account registration screen; d) generating a first database of the plurality of alcoholic beverage retailer identification information on the content management system; e) transmitting a second account registration screen to each distributor, the first account registration screen promoting each distributor to provide identification information to identify each distributor; f) receiving a response from each distributor from the second account registration screen; g) generating a second database of the plurality of alcoholic beverage distributor identification information on the content management system; h) transmitting an inventory vacancy screen to each retailer, the inventory vacancy screen promoting each retailer to provide vacancies in alcoholic beverage inventories; i) receiving a response from each retailer from the inventory vacancy screen; j) generating a third database of the plurality of alcoholic beverage inventory vacancies for each retailer on the content management system; k) transmitting an available inventory screen to each distributor, the available inventory screen promoting each distributor to provide available inventories in alcoholic beverage; l) receiving a response from each distributor from the available inventory screen; m) generating a fourth database of the plurality of alcoholic beverage available inventory for each distributor on the content management system; n) generating a fifth database of distributors in substantial real time by matching the first database of retailers with the third database for distributors that have a delivery radius which includes the location of the retailers, and matching the second database inventory vacancies from the retailer with the fourth database of available inventories; o) allowing retailers to select and make orders on the available inventory of distributors matched in the fifth database through the content management system; p) allowing distributors to select and make bids on the inventory vacancy of retailers matched in the fifth database through the content management system; q) generating a transaction order for each bid accepted by a each retailer and each offer accepted by each distributor; and r) generating a completed order upon delivery of inventory from each distributor to each retailer.

The subject invention further discloses a method of providing substantial substantial real-time available inventories to fill vacancies in retailer alcoholic beverage inventories, comprising: a) providing interactive computing devices for use by the a plurality of alcoholic beverage retailers and a plurality of alcoholic beverage distributors, the interactive computing devices operable to receive and display a series of graphical user interface screens from a content management system; b) transmitting a first account registration screen to each retailer, the first account registration screen promoting each retailer to provide identification information to identify each retailer; c) receiving a response from each retailer from the first account registration screen; d) generating a first database of the plurality of alcoholic beverage retailer identification information on the content management system; e) transmitting a second account registration screen to each distributor, the first account registration screen promoting each distributor to provide identification information to identify each distributor; f) receiving a response from each distributor from the second account registration screen; g) generating a second database of the plurality of alcoholic beverage distributor identification information on the content management system; h) transmitting an inventory vacancy screen to each retailer, the inventory vacancy screen promoting each retailer to provide vacancies in alcoholic beverage inventories; i) receiving a response from each retailer from the inventory vacancy screen; j) generating a third database of the plurality of alcoholic beverage inventory vacancies for each retailer on the content management system; k) transmitting an available inventory screen to each distributor, the available inventory screen promoting each distributor to provide available inventories in alcoholic beverage; l) receiving a response from each distributor from the available inventory screen; m) generating a fourth database of the plurality of alcoholic beverage available inventory for each distributor on the content management system; n) generating a fifth database of distributors in substantial real time by matching the first database of retailers with the third database for distributors that have a delivery radius which includes the location of the retailers, and matching the second database inventory vacancies from the retailer with the fourth database of available inventories; o) automatically notifying retailers and distributors in substantial real time of fifth database matches in retailer inventory vacancies with available inventory of distributors p) allowing retailers to select and make orders on the available inventory of distributors matched in the fifth database through the content management system; q) allowing distributors to select and make bids on the inventory vacancy of retailers matched in the fifth database through the content management system; r) generating a transaction order for each bid accepted by a each retailer and each offer accepted by each distributor; and s) generating a completed order upon delivery of inventory from each distributor to each retailer.

In embodiments of the subject invention, distributors may automatically place pre-selected bids in substantial real time on the inventory vacancies of retailers matched in the fifth database.

In further embodiments of the subject invention, retailers may automatically place pre-selected offers in substantial real time on the available inventory of distributors matched in the fifth database.

In additional embodiments of the subject invention, the second database of alcoholic beverage inventory vacancies further includes expected inventory vacancies within a preselected time.

In other embodiments of the subject invention, the transaction order comprises identification information selected from the group consisting of: beverage types, beverage amounts, payment amount, delivery location, and delivery time.

In embodiments of the subject invention, the second database comprises inventory vacancy identification information selected from the group consisting of: beverage names, beverage types, beverage style, beverage images, SKUs, brand names, producer locations, and producer names.

In further embodiments of the subject invention, the fourth database comprises available inventory identification information selected from the group consisting of: beverage names, beverage types, beverage style, beverage images, SKUs, brand names, producer locations, and producer names.

In other embodiments of the subject invention, the retailers and distributors are automatically notified with the notification system selected from the group consisting of text messages, SMS, e-mails, and automated voice calls.

In additional embodiments of the subject invention, only one authorized user of the system can make changes to the second database at a time.

In further embodiments of the subject invention, only one authorized user of the system can make changes to the fourth database at a time.

In embodiments of the subject invention, the computing device is selected from the group consisting of a laptop, a tablet, a smartphone, and a desktop computer.

In other embodiments of the subject invention, the second database may be updated through a method selected from the group consisting of: manually entering in the alcoholic beverages; scanning and automatically uploading SKUs of alcoholic beverages; and scanning and automatically uploading software recognized images of alcoholic beverages.

In embodiments of the subject invention, the fourth database may be updated through a method selected from the group consisting of: manually entering in the alcoholic beverages; scanning and automatically uploading SKUs of alcoholic beverages; and scanning and automatically uploading software recognized images of alcoholic beverages.

In embodiments of the subject invention, the invention may maintain on-line maps identifying producer, distributor, wholesalers and retailer locations that are part of the system.

In embodiments of the subject invention, the terms "substantial" or "substantially" are defined as at least close to (and can include) a given value or state, as understood by a person of ordinary skill in the art. In one embodiment, the terms "substantial" or "substantially" refers to ranges within 10%, preferably within 5%, more preferably within 1%, and most preferably within 0.1% of the given value or state being specified.

There has thus been outlined, rather broadly, the more important features of the invention in order that the detailed description of an improved toddler gate. There are additional features of the invention that will be described hereinafter and which will form the subject matter of the claims appended hereto. These together with other objects of the invention, along with the various features of novelty, which characterize the invention, are pointed out with particularity in the claims annexed to and forming a part of this disclosure.

DETAILED DESCRIPTION OF THE EMBODIMENTS

While several variations of the present invention have been illustrated by way of example in particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

The subject invention is an on-line system and method, incorporating a website and a corresponding mobile device application that will permit alcohol-serving vendors and retailers to electronically upload and maintain networked databases of alcoholic beverage inventories, including current, or expected vacancies or gaps in their alcoholic beverage inventories. Alcohol-producing breweries and wholesale distributors may electronically access the system to view these networked databases of current, or expected alcoholic beverage inventory vacancies in real-time, and make bids in real-time to fill them.

Alcohol-producing breweries and wholesale distributors may electronically upload and maintain networked databases of available alcoholic beverage inventories, including current, or expected production dates in their alcoholic beverage inventories. Alcohol-serving vendors and retailers may electronically access the system to view these networked databases of current, or expected available alcoholic beverage inventories in real-time, and make bids in real-time to order them.

These bidding processes will aid small independent breweries to enter new markets, while keeping supply costs down for wholesale distributors and alcohol-serving vendors and retailers. The invention will also decrease lag times when filling alcohol beverage inventories, especially rotating or seasonal beer taps.

This system will also permit small independent brewers to enter larger chain retailers, such as chain grocery stores. At large chain retailers, wholesale purchase decisions are made at regional, if not national levels. These large chain retailers prefer the predictability of larger producers and wholesale distributors to fill their inventory vacancies. This system will give predictability to larger chain retailers that any discontinued products can be easily replaced with other products to fill inventory vacancies. Using this system, larger chain retailers can carry rotating inventories of local independent breweries without risking gaps in their inventories.

The system software may be downloaded or accessed by retailers, wholesale distributors, or producers through on-line portals or downloadable software applications on personal computers, laptop computers, smartphones, tablet devices, or other computer workstations connected to the Internet through a wired or wireless connection. The network communication may be based on protocols such as Ethernet, IP, TCP, UDP, or IEEE 802.11.

The system provides multiple host servers; local, regional and national alcoholic inventory databases residing within the host servers; means for downloading computer and mobile device software applications; means for uploading data from a plurality of mobile computing devices; means for organizing all the uploaded data into the local, regional and national databases; means for running specific search queries from mobile computing devices on the databases; and means for displaying the search query results on the mobile computing devices. The host servers and the mobile computing devices include communication devices (such as a bus), a CPU/processor, a main operating memory, and a storage memory. Embodiments of the CPU/processor may include processors, microprocessors, multi-core processors, microcontrollers, system-on-chips, field programmable gate arrays (FPGA), application specific integrated circuits (ASIC), application specific instruction-set processors (ASIP), or graphics processing units (GPU). The host servers and the mobile computing devices store computer retrievable information and software executable instructions and may include solid state, magnetic, or optical recording mediums. The input device of the mobile computing devices may include a keyboard, a mouse, a pen, a microphone combined with voice recognition software, a camera with image recognition software, a multi-point touch screen, a bar code scanner, or an SKU scanner. The underlying architecture of the system may be implemented using one or more computer programs, each of which may execute under the control of an operating system, such as Windows, OS2, DOS, AIX, UNIX, MAC OS, iOS, ChromeOS, Android, and Windows Phone or CE.

Once the software application for the system has been downloaded or accessed on-line, users will need to register an account for the system, including the creation of login information, providing contact information, providing business operation location(s), and indicating if the user is an alcoholic beverage retailer, distributor, or producer from a mobile computing device connected to the Internet. The system will require verification of alcohol production license (s) for products, distribution license(s) for wholesales/distributors/importers, and retail licenses for retailers. In further embodiments of the subject invention, the system may require additional biometric information, including, but not limited to: a retinal scan, a fingerprint, a thumbprint, a palm print, a voice sample, or a facial pattern to create and access an account.

Once granted access to the system, retailers will be provided with graphical user interface screens that allow for easy management and uploading of alcoholic beverage inventory vacancies or inventory gaps with an input device. In embodiments of the subject invention, the system may allow one to multiple administrators to manage a retailer's inventories. The system may only allow one administrator to access the retailer's inventory at any one time to avoid duplicate inventory vacancies or orders. The input device for the mobile computing devices may include a keyboard, a mouse, a pen, a microphone combined with voice recognition software, a camera with image recognition software, a multi-point touch screen, a bar code scanner, or a SKU scanner. Alcohol-serving vendors and retailers may electronically upload alcoholic beverage inventory vacancies or gaps by manually entering in the alcoholic beverages, scanning and automatically uploading the SKUs of the alcoholic beverages, or scanning and automatically uploading software recognized images that automatically identify the alcoholic beverages. The system will permit retailers to maintain general inventory lists or spreadsheets, specific beverage type inventory lists or spreadsheets, amounts retail shelf space available for easy uploading of inventory vacancies or inventory gaps. Retailers may establish automatic uploads or updates of inventory vacancies or inventory gaps on a periodic basis to the system. In further embodiments of the subject invention, the software system may maintain template inventory lists or spreadsheets for use or modification by users.

The system will maintain local, regional and national available beverage inventory databases residing on host servers. These databases will contain available inventories of beverages identified by beverage names, beverage types, beverage prices, images, SKUs, brand names, producer locations, and producer names. These databases will also have real-time updating of production dates, inventories available within given distances, and real-time delivery schedules for all beverages. The system will also maintain on-line maps identifying beverage producer and distributor/wholesaler locations that are part of the system. Any user of the system may access the information of these beverage producers and distributor/wholesalers by clicking on the map identifiers.

The system may generate populated master order sheets of beverages for a retailer. The system will create these master order sheets by filtering alcohol beverage order options for each retailer location based on their proximity to a producer or distributor. For every producer or distributor that has a delivery radius which falls within a retailer's location, the system will automatically create one master order sheet populated with each of those producer's or distributor's products.

Retailers will also be provided with graphical user interface screens that allow for easy searching of these available beverage database inventories or expected production dates from producers and wholesale distributors. Retailers may manually search available alcoholic beverage database inventories with data entry fields for beverage names, beverage images, beverage types, beverage prices, producer names, producer locations, and zip codes. Retailers may also search the system databases by scanning and automatically uploading the SKUs of alcoholic beverages, scanning and automatically uploading images of alcoholic beverages, or scanning and automatically uploading beverage producer brand names.

Once a retailer builds an order from the available beverage database inventories, the system will provide them with delivery schedule options. Retailers can also request a certain delivery time from the producer or distributor directly through the system. The system will contain all the electronic paperwork for the order and delivery, which will be maintained in each user's account. Once a shipment is delivered, the retailer will confirm receipt and the system will complete the transaction.

Retailers may establish automatic searches or orders on a periodic basis on the system or upon vacancies in their beverage inventory. In additional embodiments of the subject invention, retailers may have automatic notifications forwarded to them electronically to their mobile computing devices by e-mail, SMS text, or other notification systems without conducting an active search on alcoholic beverage inventories.

Another feature of the system may permit retailers to order and receive alcoholic beverages on the same day. The delivery radius of same day order and delivery may be smaller than that of the regular order sheet.

Retailers may set up a bidding process for wholesale distributors or producers to fill inventory vacancies, including same day, on-demand inventory vacancy filling. These bids may be set to automatic acceptance once a certain price point for a certain beverage quantity, by a given delivery time or date, has been met by a wholesale distributor or producer. Retailers may automatic notifications forwarded to them electronically to their mobile computing devices once a bid has been fulfilled. Once an order has been accepted by a retailer, the system will provide the retailer, wholesale distributor, and producer with each other's contact information by automatic notifications forwarded to their mobile computing devices, in case the order is delayed for any reason. The system may also provide real-time delivery notifications to the retailer.

In embodiments of the subject invention, the alcoholic beverage retailer or vendor may be a permanent physical location such as a bar, restaurant, grocery store, liquor store, stand, concert hall, stadium, dance club, movie theater, casino, racetrack, park, arena, school, hall or other liquor retail outlets; or the point of sale may be a temporary location for specific events, such as concerts, fair grounds, circus tents, and sporting events. The use of the terms vendor or retailer are not meant to be limiting.

Once granted access to the system, wholesale distributors and producers will be provided with graphical user interface screens that allow for easy management and uploading of alcoholic beverage available inventories and expected production dates with an input device. In embodiments of the subject invention, the system may allow one to multiple administrators to manage a wholesale distributors and producers available inventories. The system may only allow one administrator to access the wholesale distributors and producers available inventory at any one time to avoid duplicate inventories or orders. The input device for the mobile computing devices may include a keyboard, a mouse, a pen, a microphone combined with voice recognition software, a camera with image recognition software, a multi-point touch screen, a bar code scanner, or a SKU scanner. Wholesale distributors and producers may electronically upload what products they are licensed to distribute or self-distribute, including customization of all the products they sell, including alcoholic beverage type, beverage styles, quantities, types of packaging available, and prices. In embodiments of the subject invention, wholesale distributors and producers may electronically upload alcoholic beverage available inventories by manually entering in the alcoholic beverages, scanning and automatically uploading the SKUs of the alcoholic beverages, or scanning and automatically uploading software recognized images that automatically identify the alcoholic beverages. The system will permit wholesale distributors and producers to maintain real-time general available inventory lists or spreadsheets, or specific beverage type inventory lists or spreadsheets. Wholesale distributors and producers may establish automatic uploads or updates of available inventory or expected production dates on a periodic basis to the system. In further embodiments of the subject invention, the software system may maintain template available inventory lists or spreadsheets for use or modification by users.

The system will maintain local, regional and national beverage inventory vacancy databases residing on host servers. These databases will contain vacancies of beverages identified by beverage names, beverage types, beverage prices, images, SKUs, brand names, retailer locations, and retailer names. These databases will also have real-time updating of vacancies, inventory requests or gaps within given distances, and real-time delivery requests for all beverages. The system will also maintain on-line maps identifying retailer locations that are part of the system. Any user of the system may access the information of these retailers by clicking on the map identifiers.

Wholesale distributors and producers will be provided with graphical user interface screens that allow for easy searching of alcoholic beverage retailer inventory vacancies or gaps. Wholesale distributors and producers may manually search alcoholic beverage inventory vacancies or gaps with data entry fields for beverage names, beverage types, retailer names, retailer locations, and zip codes or by setting a radius via map application. Wholesale distributors and producers may also search the system by scanning and automatically uploading the SKUs of alcoholic beverages, scanning and automatically uploading images of alcoholic beverages, or scanning and automatically uploading retailer brand names.

Wholesale distributors and producers may establish automatic searches on a periodic basis on the system. Alcohol-producing breweries and wholesale distributors may have automatic notifications forwarded to them electronically to their mobile computing devices by e-mail, SMS text, or other notification systems without conducting an active search on the databases alcoholic beverage inventory vacancies.

In embodiments of the subject invention, the system will automatically update databases of available inventories from producers and wholesale distributors, and inventory vacancies from retailers by location. The system will generate real time GUI maps to list available inventories and inventory vacancies within a certain geographic area.

Beverage orders may be manually accepted by wholesale distributors or producers, or automatically filled.

Wholesale distributors or producers may set up automatic bidding for inventory vacancies within a certain geographic area. Alcohol-producing breweries and wholesale distributors may have automatic notifications forwarded to their mobile computing devices once a bid has been fulfilled.

Wholesale distributors or producers may set up a bidding process for retailers to order available inventory, including same day, on-demand available inventory.

These bids may be set to automatic acceptance once a certain price point for a certain beverage quantity, by a given delivery time or date, has been met. Wholesale distributors or producers may have automatic notifications forwarded to their mobile computing devices once a bid has been fulfilled. Once an order has been accepted by a retailer, the system will provide the retailer, wholesale distributor, and producer with each other's contact information by automatic notifications forwarded to their mobile computing devices, in case the order is delayed for any reason. The system may also provide real-time delivery notifications to the retailer.

In embodiments of the subject invention, the distributor or producer may be a wholesaler, brewery, winery, cidery, distillery, farm, orchard, or an importer. The use of the terms distributor or producer are not meant to be limiting.

A further embodiment of the system will include rating systems for retailers, producers, and wholesale distributors. Any party may rate the others for orders received or fulfilled by quality of product delivered, quality of delivery, timing of delivery, professionalism, and timing of payment. Ratings for retailers, producers, and wholesale distributors may be ranked on the system. Each party maintains a running rating that improves with completed deliveries or declines with incomplete deliveries. The system may further include comment systems for retailers, producers, and wholesale distributors.

In a further embodiment of the subject invention, the system may have limited accessibility for the general public. The general public may be able to view inventories available at retailers by retailer name, location, beverage name, or beverage type. The general public may also be able to search inventories of wholesale distributors and producers and make requests to retailers to obtain a quantity of such inventories. The general public may order a given quantity of an alcoholic beverage from a producer or wholesale distributor for purchase and pick-up at the retailer.

The system may generate revenue through subscription access fees, on-line advertising by wholesale distributors or producers, a percentage of sales generated through the system, or a transaction fee for each sale completed.

The many aspects and benefits of the invention are apparent from the detailed description, and thus, it is intended for the following claims to cover such aspects and benefits of the invention, which fall within the scope, and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A system for providing substantial real-time orders to fill vacancies in retailer alcoholic beverage inventories, comprising:
   a computing device comprising executable software; a data storage device;
   a first database of a plurality of alcoholic beverage retailers identification information on the data storage device;
   a second database of alcoholic beverage inventory vacancies for each retailer on the data storage device, wherein the second database is updatable by each retailer;
   a third database of a plurality of alcoholic beverage distributors identification information on the data storage device;

a fourth database of alcoholic beverage available inventory from each of the plurality of distributors on the data storage device, wherein the fourth database is updatable by each distributor;

a fifth database of distributors generated in substantial real time by the system each time the first, second, third, or fourth database is updated, by: i) matching the first database of retailers with the third database for distributors that have a delivery radius which includes the location of the retailers, and ii) matching the second database inventory vacancies from the retailer with the fourth database of available inventories;

wherein the fifth database is accessible to the distributors to select and make bids on the inventory vacancy of retailers matched in the fifth database, and further wherein the fifth database is accessible to the retailers to select and place orders on the available inventory of distributors.

2. The system of claim 1, wherein distributors preselected bids are automatically placeable in substantial real time on the inventory vacancies of retailers matched in the fifth database.

3. The system of claim 1, wherein retailers pre-selected offers are automatically placeable in substantial real time on the available inventory of distributors matched in the fifth database.

4. The system of claim 1, wherein the second database of alcoholic beverage inventory vacancies further includes expected inventory vacancies within a pre-selected time.

5. The system of claim 1, wherein the second database comprises inventory vacancy identification information selected from the group consisting of: beverage names, beverage types, beverage style, beverage images, SKUs, brand names, producer locations, and producer names.

6. The system of claim 1, wherein the fourth database comprises available inventory identification information selected from the group consisting of: beverage names, beverage types, beverage style, beverage images, SKUs, brand names, producer locations, and producer names.

7. The system of claim 1, wherein the computing device is selected from the group consisting of a laptop, a tablet, a smartphone, and a desktop computer.

8. The system of claim 1, wherein the second database is updatable through a method selected from the group consisting of: manually entering in the alcoholic beverages; scanning and automatically uploading SKUs of alcoholic beverages; and scanning and automatically uploading software recognized images of alcoholic beverages.

9. The system of claim 1, wherein the fourth database is updatable through a method selected from the group consisting of: manually entering in the alcoholic beverages; scanning and automatically uploading SKUs of alcoholic beverages; and scanning and automatically uploading software recognized images of alcoholic beverages.

10. A system for providing substantial real-time orders to fill vacancies in retailer alcoholic beverage inventories, comprising:

a computing device comprising executable software; a data storage device;

a first database of a plurality of alcoholic beverage retailers identification information on the data storage device;

a second database of alcoholic beverage inventory vacancies for each retailer on the data storage device, wherein the second database is updatable by each retailer;

a third database of a plurality of alcoholic beverage distributors identification information on the data storage device;

a fourth database of alcoholic beverage available inventory from each of the plurality of distributors on the data storage device, wherein the fourth database is updatable by each distributor;

a fifth database of distributors generated in substantial real time by the system each time the first, second, third, or fourth database is updated, by: i) matching the first database of retailers with the third database for distributors that have a delivery radius which includes the location of the retailers, and ii) matching the second database inventory vacancies from the retailer with the fourth database of available inventories;

wherein the fifth database is accessible to the distributors to select and make bids on the inventory vacancy of retailers matched in the fifth database, and the fifth database is accessible to the retailers to select and make offers on the available inventory of distributors matched in the fifth database a transaction order generatable by the system for each bid accepted by each retailer, and each offer accepted by each distributor; and a completed order generatable by the system upon delivery of inventory from the each distributor to each retailer.

11. The system of claim 10, wherein the transaction order comprises identification information selected from the group consisting of: beverage types, beverage amounts, payment amount, delivery location, and delivery time.

12. A system for providing substantial real-time orders to fill vacancies in retailer alcoholic beverage inventories, comprising:

a computing device comprising executable software; a data storage device;

a first database of a plurality of alcoholic beverage retailers identification information on the data storage device;

a second database of alcoholic beverage inventory vacancies for each retailer on the data storage device, wherein the second database is updatable by each retailer;

a third database of a plurality of alcoholic beverage distributors identification information on the data storage device;

a fourth database of alcoholic beverage available inventory from each of the plurality of distributors on the data storage device, wherein the fourth database is updatable by each distributor;

a fifth database of distributors generated in substantial real time by the system each time the first, second, third, or fourth database is updated, by: i) matching the first database of retailers with the third database for distributors that have a delivery radius which includes the location of the retailers, and ii) matching the second database inventory vacancies from the retailer with the fourth database of available inventories; and wherein the system comprises automatic notifications sendable to retailers and distributors in substantial real time upon fifth database matches in retailer inventory vacancies with available inventory of distributors.

13. The system of claim 12, wherein the automatic notifications sendable to retailers and distributors system are selected from the group consisting of text messages, SMS, e-mails, and automated voice calls.

* * * * *